United States Patent [19]

Inuiya

[11] 3,936,596

[45] Feb. 3, 1976

[54] OPTICAL PROJECTION APPARATUS

[75] Inventor: Masafumi Inuiya, Saitama, Japan

[73] Assignee: Fuji Photo Film Co., Ltd., Minami-ashigara, Japan

[22] Filed: Jan. 22, 1974

[21] Appl. No.: 435,626

[30] Foreign Application Priority Data

Jan. 22, 1973 Japan.................................. 48-9361

[52] U.S. Cl. ...................... 178/6; 178/6.8; 178/7.6; 178/15; 178/DIG. 22; 178/DIG. 28; 179/2 TV; 340/146.3 SY

[51] Int. Cl.².... G08B 5/00; H04N 7/14; H04N 7/18

[58] Field of Search........ 178/DIG. 22, DIG. 28, 15, 178/6.8, 7.6; 179/2 TV; 340/146.3 SY; 128/6

[56] References Cited

UNITED STATES PATENTS

| | | | |
|---|---|---|---|
| 2,783,454 | 2/1957 | North................................. | 340/149 |
| 2,986,596 | 5/1961 | Hammond ........................... | 178/5.6 |
| 3,801,741 | 4/1974 | Ablett.................................. | 178/6.8 |
| 3,885,096 | 5/1975 | Inviya ................................. | 178/15 |

*Primary Examiner*—Howard W. Britton
*Assistant Examiner*—Edward L. Coles
*Attorney, Agent, or Firm*—Sughrue, Rothwell, Mion, Zinn & Macpeak

[57] ABSTRACT

An optical projection apparatus including a projection screen on which a microimage is projected on an enlarged scale and adapted to be connected with an information processing system comprising;

microfilm feeding means which feeds and stops a microfilm on which a plurality of images are recorded, each image of the microfilm comprising an image frame portion and a code pattern portion recorded adjacent the image frame, each code in the code pattern portion representing information concerning a part of the image of the image frame portion positioned at a position corresponding to the code, an optical projection system for projecting an image of the image frame portion onto a transmission type projection screen and projecting an image of the code pattern portion onto a reflection type projection screen provided in a side by side relation with the transmission type projection screen, a light source device for illuminating a part of the image projected on the transmission type projection screen selectively from the opposite side of the screen to the optical projection system, means for taking a view of the screen from the side of the projection system and putting out an image signal representing the view taken thereby, signal conversion means for receiving the output image signal and converting the signal into a computer input signal representing the information concerning a part of the image of the image frame portion illuminated by the light source means, and control means for controlling the microfilm feeding means according to an output signal of the computer.

6 Claims, 9 Drawing Figures

OPTICAL PROJECTION APPARATUS

BACKGROUND OF THE INVENTION

1. Field of the Invention

This invention relates to an optical projection apparatus, and, more particularly, to an optical image projecting apparatus in which an operator of the apparatus who observes the image projected on the screen can generate an output carrying information concerning a part of the image by pointing to part of the image with light spot using a light pen or the like.

2. Description of the Prior Art

An optical image projecting apparatus to which this invention pertains is an apparatus in which an optical image is projected on a projection screen incorporated therein from a recording medium such as a film sheet bearing a number of micro images. The image recorded on the medium is enlarged and projected on the screen and a part of the image projected on the screen is converted into an electric signal when the operator of the apparatus points at the image with a light spot using a light pen or the like. The body of the optical image projecting apparatus can be a microreader, a slide projector or another kind of image projector. This invention, however, is most effectively applied to a microreader which is used as an interface of an image man-machine system. This invention will be hereinafter described with particular reference to an embodiment thereof applied to the microreader used as the interface.

The term "light pen" referred to in this specification in connection with this invention is not the conventional light pen which is used in association with a CRT display of a computer to put a signal in a computer. The light pen used in connection with this invention contains a built-in lamp to project a light spot on the screen and does not contain a photoreceptor to detect the light on the screen, while the conventional light pen used in a computer system is provided with a photoreceptor to detect the light of the raster on the CRT.

It is well known in the electronic computer art to use a CRT graphic display device as an interface in a man-machine system, in which the operator of the computer generates an output by pointing at the information displayed on the CRT with a light pen. This kind of CRT graphic display device is disadvantageous in that all of the images to be displayed must be stored in the memory of the computer and accordingly the expense of the entire system is considerable. In addition complicated images having various gradations cannot be clearly and sharply reproduced on the faceplate of the cathode ray tube. Comparing the cost of the system, the storage cost for the magnetic drum, magnetic disc and magnetic tape and the like used as a memory of a computer is about 4 cents to about $4,000 per image, while that for microfilm is about 12 to about 20 cents including the cost of the retrieval device, in case of memorizing an image having various gradations recorded on an A4-size medium (210 × 297 cm). The microfilm projecting or viewing device which is more economical than the CRT graphic display device as shown above, however, is disadvantageous in that it is impossible to put an input directly into an information treating system such as a computer from the projection screen thereof. When using a microfilm projector, the operator of the computer must use an unput keyboard to put information into the computer viewing the image projected on the screen of the projector.

In view of the above described disposition of the conventional apparatus, an apparatus must be provided which projects an optical image from a recording medium of low cost and enables the operator of the computer to put information directly into the computer from the image projected on a screen.

Therefore, a primary object of the present invention is to provide an optical image projecting apparatus which projects an optical image sharply on a projection screen from economical microfilm and in which the information projected on the screen can be converted into an electric signal and put into an information processing system by pointing at the screen with a light spot so that the information on the screen can be put directly into the information processing system such as a computer.

Another object of the present invention is to provide an optical image projecting apparatus which is used as an interface in a man-machine system and requires a very small amount of memory in the information processing system.

SUMMARY OF THE INVENTION

In accordance with the present invention, the invention provides an optical image projecting apparatus which projects an image on a projection screen from a microfilm, in which a photoelectric light spot and code pattern detecting means built in the apparatus detects the code pattern corresponding to the image information illuminated by a light spot with a light pen and converts the code pattern into a bit signal to be transmitted to a computer. The signal is then used as a retrieval signal for selecting an image to be subsequently projected or used as data for the processing of various information. The microfilm used in this projecting apparatus carries a number of microimages together with code patterns relating to various types of information concerning the image.

These and other objects, features and advantages of the present invention will be made apparent from the following detailed description of the preferred embodiment thereof taken in conjunction with the accompanying drawings.

BRIEF DESCRIPTION OF THE ACCOMPANYING DRAWINGS

DESCRIPTION OF PREFERRED EMBODIMENTS

Figure 1:
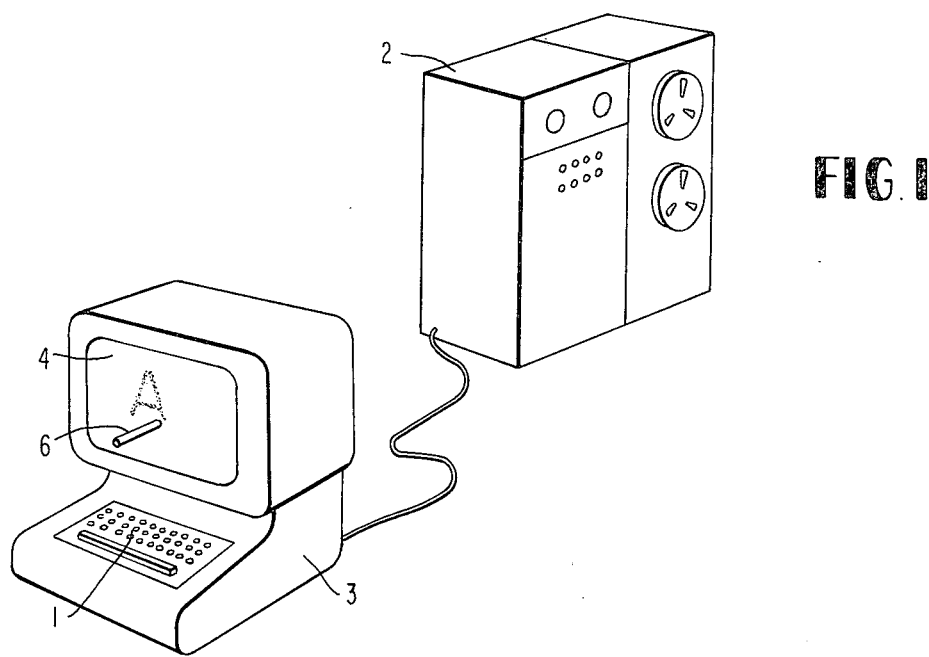
FIG. 1 is a perspective view showing the overall construction of a man-machine system in which the optical projection apparatus in accordance with the present invention is connected with a computer.

Referring to FIG. 1 showing the overall view of a system in which the image projecting apparatus in accordance with thid invention can be employed, a person who uses this system (hereinafter referred to as "operator") generates an input A when he desires to obtain information concerning A. The input A is put into the apparatus using keyboard 1 of a microreader 3. The input signal is immediately transmitted to a computer 2 through an interface circuit built in the microreader 3. In the computer, the signal serves as data for the treatment of the information, and consequently, a coordinate signal (hereinafter referred to as "microimage retrieval signal") indicating the coordinate of the image among the number of images on the microfilm carrying the information A is put out and sent to the microreader 3. When the microimage retrieval signal is put into the microreader 3, the image carrying the information A is projected on a projection screen 4 by a microfilm retrieval mechanism and an optical projection system within the microreader 3. In the image projected on the screen 4, the titles of a', a'', a''' . . . and instructions such as "Point to a title desired with the light pen" are included. These titles and instructions can be recorded on the microfilm at the time when the images are recorded thereon.

If the operator of the system viewing the image concerning the information A points to the title a with the light pen 6, the information a is immediately converted into an electric signal and sent to the computer 2 from the microreader 3. When the information pointed by the light pen 6 is put into the computer 2, the computer 2 again performs information retrieval according to the signal and consequently a microimage retrieval signal concerning the information a is put out from the computer 2 and put into the microreader 3. Thus, the image concerning the information a is projected on the screen 4 of the microreader 3. Then, the operator is again able to send a signal concerning information for a part of the image on the screen directly to the computer 2 using the light pen 6. Of course, the operator can use the keyboard 1 instead of the light pen 6 to send an information signal to the computer 2.

Figure 2:
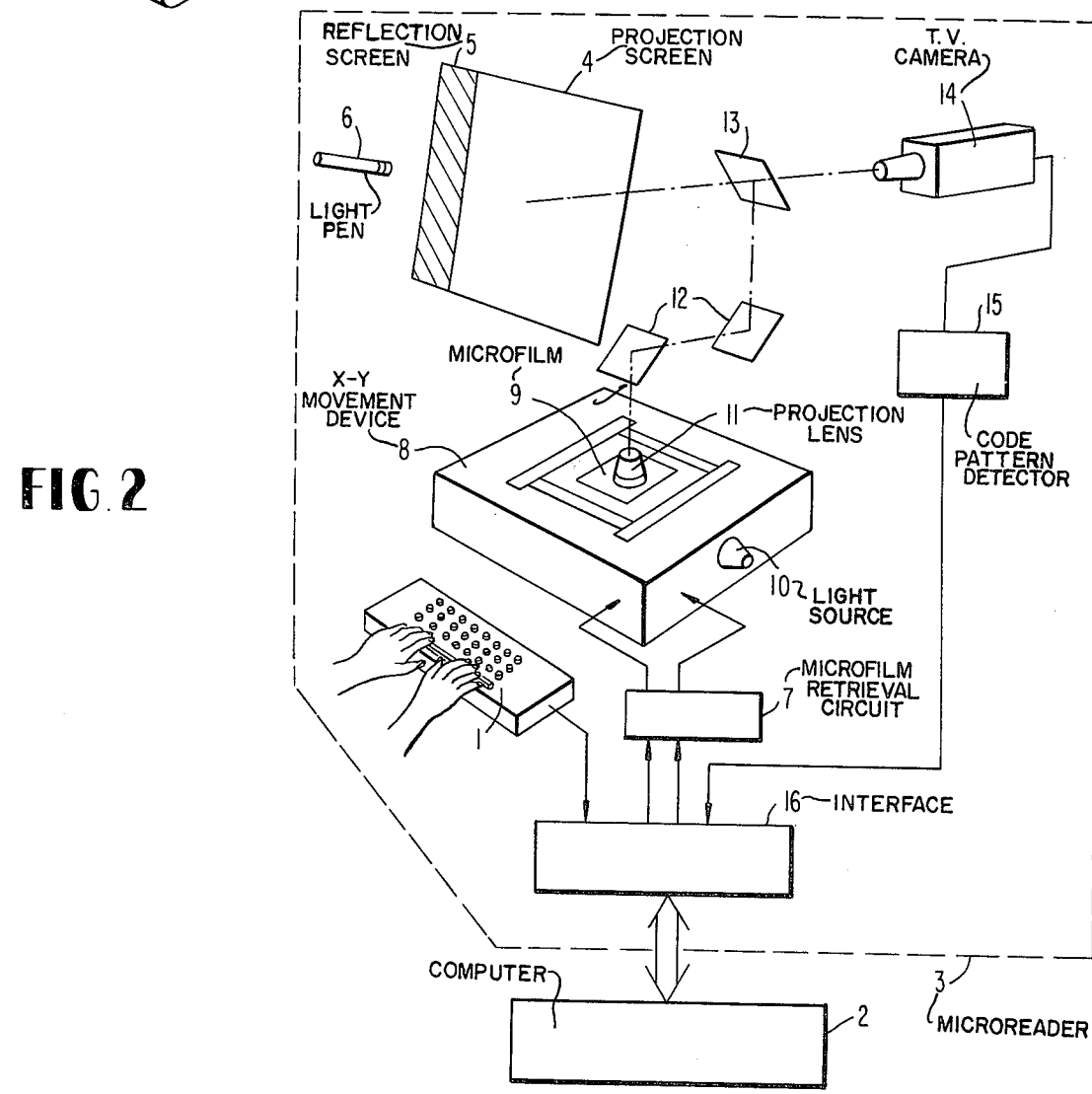
FIG. 2 is a block-diagram showing an embodiment of a microreader in accordance with the present invention including a perspective view of a part of the internal construction thereof.

Now referring to FIG. 2 showing in greater detail the image man-machine system employing the microreader 3 in accordance with the present invention in association with a computer 2, the operator of the system generates an input by typing in the index indicating the content which the operator desires to see on the screen 4 using the keyboard 1 of the microreader 3. The input signal is properly processed (for example alphanumeric designations are converted into a code according to predetermined program) through an interface circuit 16, examples of which are well known in the art, and then transmitted to the computer 2. In the computer 2, an appropriate information retrieval processing is performed according to the input code signal. (for example the input signal and the recorded information in the memory are compared.) After the processing, a microimage retrieval signal corresponding to the input index is put out from the computer 2 and sent to the microreader 3. The retrieval signal is appropriately processed through the interface circuit 16 and put into a microfilm retrieval circuit 7, well known in the art, one example of which is disclosed in Belgian Pat. No. 703,080, to operate an X–Y movement device 8. Consequently, the desired image in the microfilm 9 is retrieved and moved to the center of the projection optical system of the microreader 3. The microimage retrieved is projected onto the projection screen 4 by a projection optical system comprising a light source 10, a projection lens 11, a mirror 12 and a half-transparent mirror 13.

Figure 3:
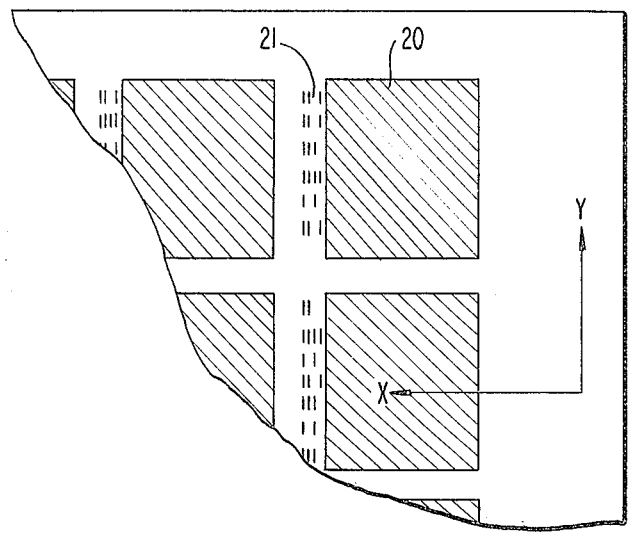
FIG. 3 is a fragmentary view of a part of the microfilm used in the microreader in accordance with the present invention.

On the microfilm 9 are recorded a number of microimages which comprise a number of image frame portions 20 and a number of code pattern portions 21 appended thereto as shown in FIG. 3. The code pattern portion 21 includes a black-and-white bit pattern signal indicating the type of information contained in the image to which the code pattern is appended.

For example, photographs of goods A, B, C . . . can be arranged in the image frame portions 20 in the Y direction in FIG. 3 and the names, prices and other information corresponding to the goods can be recorded in the code pattern portions 21 in the form of a black-and-white bit pattern. The shape, size and arrangement of the screen 4 and the optical projection system are designed so that the code pattern portions 21 are not projected on the screen 4 together with the image frame portions 20 when a microimage in the microfilm 9 is retrieved and projected on the screen 4 by the optical system as shown in FIG. 2. The transmission type projection screen 4 is provided with a reflection type projection screen 5 extending flush therewith on which the code pattern portions 21 are projected as shown in FIG. 2.

Therefore, only the image frame portions 20 projected on the transmission type projection screen 4 can be seen by the operator of the microreader 3 and the code pattern portions 21 can only be seen from backside of the screen, i.e. from the side toward the television camera 14.

When the operator of the microreader who views the photographs of the goods desires to know the information concerning the goods A, the operator points at the photograph of the goods A on the screen 4 with the light pen 6.

Figure 4:
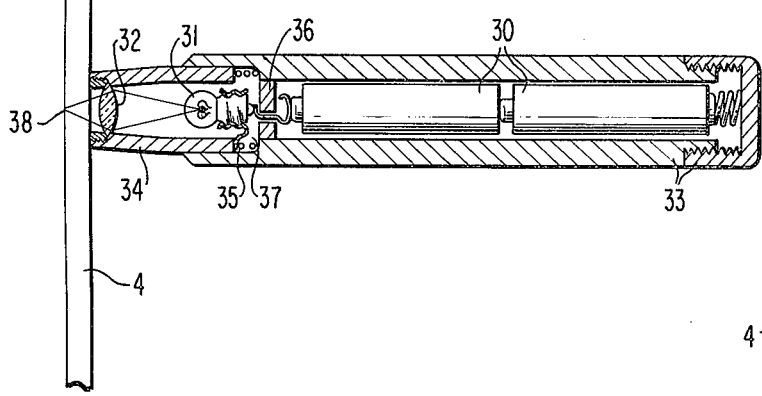
FIG. 4 is a longitudinal sectional view showing the construction of the light pen used in the apparatus in accordance with the present invention.

An embodiment of the light pen 6 is shown in FIG. 4, in which two dry cells 30 are contained in a metal casing 33 to energize a lamp 31. The lamp 31 is fixed in the casing 33 and electrically connected with one terminal of the dry cells 30. A movable light pen head 34 with a converging lens 32 is slidably inserted in the head portion of the casing 33. A compression spring 35 is disposed in the casing so as to bias the head 34 in the direction to open a switch 37 of the lamp 31. When the light pen head 34 is pushed inward overcoming the compression spring 35, the switch 37 is closed and the lamp 31 is electrically connected with the both terminals of the dry cells 30 and energized accordingly. The reference numeral 36 indicates an insulating member disposed in the casing 33 to support the lamp 31. The light of the lamp 31 is focussed as light spot 38 on the surface of the transmission type projection screen 4 as shown in FIG. 4. It can be understood that the switch 37 can be of any other type than that described above. For instance, the switch 37 can be of a type which is turned on and off manually. Further, the light pen 6 can be electrically connected with any power source suitable for energizing the light.

Figure 5:
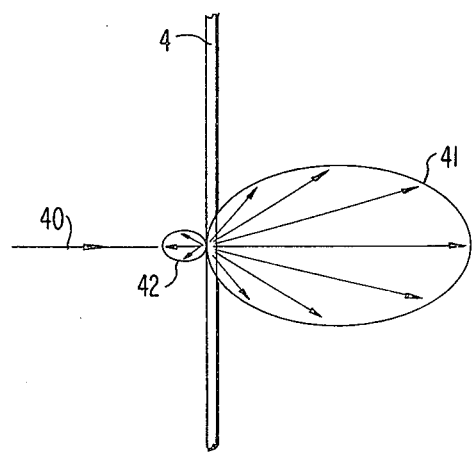
FIG. 5 is a side view of the projection screen showing the distribution of light transmitted therethrough.
Figure 6:
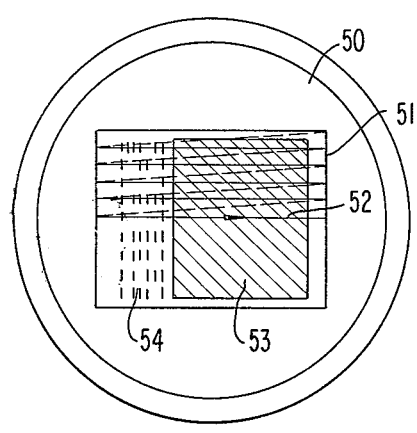
FIG. 6 is a front view showing the photoelectric surface of an image pickup tube of a television camera on which the image of the microfilm is focussed.

When a part of the image of the screen 4 is pointed to with the light pen 6, the light spot 38 is focussed on the screen 4. It is preferred that the transparent projection screen 4 have the distribution characteristics as shown in FIG. 5, in which the transmitted light component 41 is much greater than the reflected light component 42 of the incident light 40 impinging on the screen 4. Such distribution characteristics are conventional general transmission type projection screens. The ideal transmission type screen has no reflection component.

By using the transmission type projection screen 4 as described above, the image frame portions 20 can be darkened in comparison withh the code pattern portions 21 projected on the reflection type screen 5 and the light spot 38 when viewed from backside of the screen 4. Therefore, when viewing the screens 4 and 5 from the backside thereof with a monitor television connected with a television camera 14 which receives the light from the screen 4 through the half-transparent mirror 13, the light spot 38 and the code pattern images are seen with high intensity and the images of the microfilm projected on the transmission type screen 4 can barely be seen. Further, the ambient light coming into the microreader 3 through the screen 4 is uniformly diffused, and accordingly, there is no concern with any unexpected influence due to ambient light on the information processing.

The television camera 14 which receives the image on the screens 4 and 5 through the half-transparent mirror 13 is so designed and positioned that the image 53 of the image frame portion 20 of the microimage projected on the transmission type screen 4 and the image 54 of the code pattern portion 21 of the microimage projected on the reflection type screen 5 can be focussed on the photoelectric surface 50 of the image pickup tube therein within the range of scanning 51 of an electron beam thereof in the X direction (as shown in FIG. 3) of the frame arrangement parallel to the direction of scanning of the electron beam 52. Accordingly, the output image signal from the television camera 14 is a function of the density of the microimage taken along the X direction.

Figure 7A:
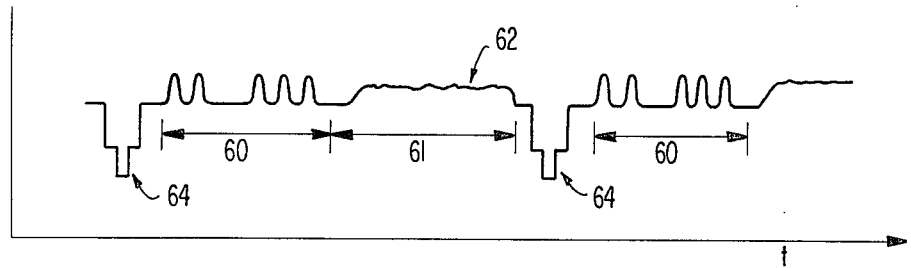
FIGS. 7a and 7b are graphical representations showing the image signal wave form of the output from the television camera.

When the output image signal is viewed through an oscilloscope, the wave form as shown in FIG. 7a can be observed. Referring to FIG. 7a, the signal indicated at 60 is an image signal corresponding to the code pattern portion 21 of the microimage (hereinafter referred to as "code pattern signal") which is reflected by the reflection type screen and therefore has sufficient intensity. The signal 61 corresponds to the image frame portion 20 of the microimage which is reflected by the transmission type screen 4 superposed with ambient light. The signal 61 is sometimes superposed with a signal representing the light spot 38 formed on the screen 4 by the light pen 6 (hereinafter referred to as "light pen signal"). FIG. 7a shows a wave form without the light pen signal, and the wave form shown in FIG. 7b has the light pen signal at 63. Even when the light pen signal 63 does not appear, the signal 61 is a flat signal having some level portions 62 due to ambient light.

The black-and-white bit signals in the code pattern portions 21 are recorded next to the image frame portions 20 so that the bit signal can be located in correspondence to the part of the image in the image frame portion 20 in the X direction. Therefore, the code pattern signal 60 appearing next to the signal 61 with the light pen signal 63 indicates the code which represents the image at which the operator points. Thus, it becomes possible to transmit the signal representing the information which the operator of the microreader desires to send to the computer 2, using an electric circuit which detects the code pattern signal 60 next to the signal 61 with the light pen signal 63 and generates an output representing the code pattern signal 60 detected.

Figure 7B:
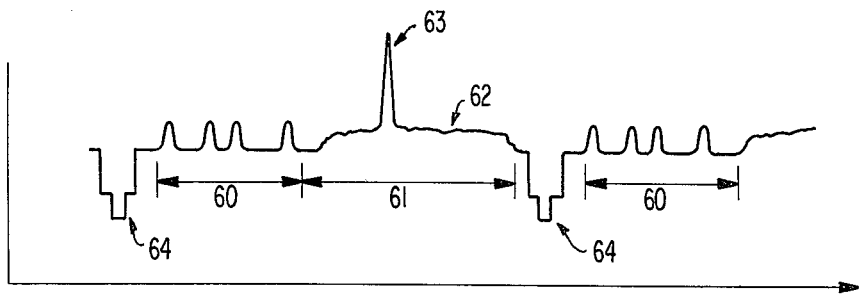
Figure 8:
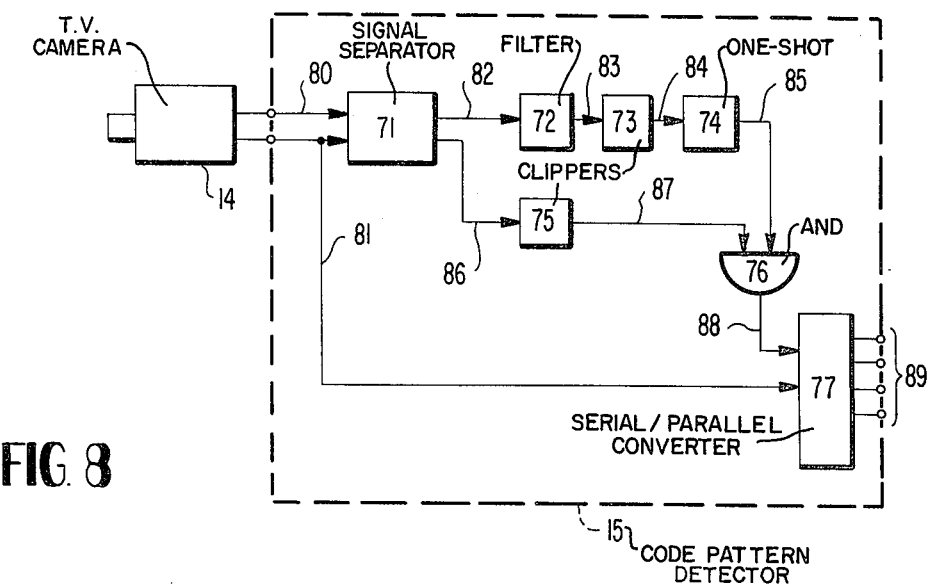
FIG. 8 is a blockdiagram of an electric circuit which converts the code pattern corresponding to the information illuminated by the light spot into an electric signal.

One embodiment of such an electric circuit 15 connected with television camera 14 will now be described in detail referring to FIG. 8. When the image signal 80 having a form as shown in FIG. 7b and a horizontal synchronizing signal 81 (corresponding to the signal 64 shown in FIGS. 7a and 7b) are put into the code pattern detecting circuit 15 as detailed in FIG. 8, the image signal 80 is first divided into a code pattern signal 60 and the light pen signal including flat signal 61 by a signal separating circuit 71 by time sharing with respect to the horizontal synchronizing signal 81. The signal including the light pen signal 63 is indicated by the reference numeral 82 and the code pattern signal 60 separated by the separating circuit 71 is shown by the numeral 86 in FIG. 8. The ambient light signal 62 in the signal 82 is filtered through a high pass filter 72 and a clipping circuit 73, one commercial example of which is LM 311, National Semiconductor Corp., whereby a pulse 84 is put out from the circuit 73 only when a signal including the light pen signal 63 is put into the filter 72. The pulse 84 is converted into a pulse 85 having width of 63µs through a monostable multivibrator 74, such as SN 74121 of Texas Instruments Corp. The reference numeral 83 indicates a signal sent to the clipping circuit 73 from the high-pass filter 72.

On the other hand, the code pattern signal 86 separated by the circuit 71 is clipped by a clipper 75 and the clipped signal 87 is put into an AND circuit 76, such as SN 7408 of Texas Instruments Corp., together with the pulse 85 from the monostable multivibrator 74. The output signal 88 from the AND circuit 76 is obtained only when the television camera 14 detects the light spot 38 of the light pen 6. The wave form of the output signal from the AND circuit 76 corresponds to the bit signal indicating the information corresponding to the part of the image projected on the screen pointed to with the light pen 6. Although the output signal 88 of the AND circuit 76 is a sequential bit signal, it is possible to convert it into a parallel bit signal 89 through a sequential-parallel conversion circuit 77, such as SN 74164 of Texas Instruments Corp. The parallel bit signal 89 is transmitted to an information processing system such as a computer through an interface circuit 16. If the information processing system such as a computer 2 performs information processing according to the signal sent from the microreader 3 and sends back an order signal to the microreader to project a new image according to the signal, the microreader 3 with the light pen in accordance with the invention can be used as a man-machine system together with the computer 2.

It is to be understood that the code patterns can be recorded on the top of the image frame portions as well as on the side thereof so that the information on the microfilm can be scanned by two television cameras horizontally and vertically. By using two television cameras, it is possible to send two types of information from the microreader to the computer just by pointing at a point on the image on the screen of the microreader.

It is to be further understood that the television camera used in the above described embodiment for converting the code pattern and the light spot into electric signals can be of any type using a vidicon, an image orthicon or an image sector, or can be an electric image pickup device using solid image pickup elements or photoelectric elements arranged in a lattice form.

While the invention has been described in detail and with reference to specific embodiments thereof, it will be apparent to one skilled in the art that various changes and modifications can be made therein without departing from the spirit and scope thereof.

What is claimed is:

1. An optical projection apparatus including a projection screen on which a microimage is projected on an enlarged scale and adapted to be connected with an information processing system comprising;

microfilm feeding means which feeds and stops a microfilm on which a plurality of images are recorded, each image of said microfilm comprising an image frame portion and a code pattern portion recorded adjacent the image frame, each code in the code pattern portion representing information concerning a part of the image of the image frame portion positioned at a position corresponding to said code, an optical projection system for projecting an image of the image frame portion onto a transmission type projection screen and projecting an image of the code pattern portion onto a reflection type projection screen provided in a side by side relation with said transmission type projection screen, a light source means for illuminating a part of the image projected on the transmission type projection screen selectively from the opposite side of said optical projection system, means for taking a view of the screen from the side of the projection system and putting out an image signal representing the view taken thereby, signal conversion means for receiving said output image signal and converting said signal into a computer input signal representing the information concerning a part of the image of said image frame portion illuminated by said light source means, and control means for controlling said microfilm feeding means according to an output signal of the computer.

2. The optical projection apparatus as defined in claim 1, wherein said light source device is a light pen including a lamp with a converging lens selectively energizable to illuminate a part of the image on said screen.

3. The optical projection apparatus as defined in claim 2, wherein said light pen is provided with a switch means energizing said lamp when said pen is pushed on the surface of said screen.

4. The optical projection apparatus as defined in claim 1, wherein said means for taking a view of the screen is a television camera.

5. The optical projection apparatus as defined in claim 4, wherein said television camera comprises a photoelectric portion which has sufficient size to cover the image of said image frame portion and said code pattern portion and on which an electron beam scans in the direction to cross the boundary of the image frame portion and the code pattern portion.

6. The optical projection apparatus as defined in claim 1, wherein said signal conversion means comprises a means for converting a sequential signal into a parallel signal.

* * * * *